INVENTORS
CHARLES T. BREITENSTEIN,
DONALD C. PEARL &
LEONARD BUDNER

United States Patent Office

3,498,502
Patented Mar. 3, 1970

3,498,502
BULK MILK DISPENSER SYSTEM
Charles T. Breitenstein, Elk Grove Village, Donald C. Pearl, Lake Zurich, and Leonard L. Budner, Alsip, Ill., assignors, by mesne assignments, to Rowe International, Inc., Whippany, N.J., a corporation of Delaware
Filed Jan. 15, 1968, Ser. No. 697,880
Int. Cl. B67d 5/22, 5/08, 1/08
U.S. Cl. 222—36                                   24 Claims

ABSTRACT OF THE DISCLOSURE

The disclosed system includes a tank for bulk storage of refrigerated liquid suitable for human consumption, such as whole milk or reconstituted milk, and a number of dispensing control stations connected to the tank for dispensing a metered quantity of liquid on demand as controlled by insertion of a coin or token and depression of a button at one of the dispensing stations.

Within the system, the liquid is recirculated constantly to maintain a supply of fresh liquid at each of the dispensing stations.

The system includes safety features to prevent dispensing of spoiled milk. The system includes means operative to automatically shut itself down when the milk supply is used and it further includes automatic cleaning and sanitizing sub-systems which operate to clean the system before it is refilled.

BACKGROUND OF THE INVENTION

Providing a supply of liquids suitable for human consumption such as milk in large quantities presents problems particularly in areas where a fresh supply is not readily available. In such areas, where large amounts of liquid are not rapidly used, preservation of the liquid is essential. Furthermore, problems arise should the liquid be exposed to conditions that would cause its deterioration and make it unfit for consumption.

SUMMARY OF THE INVENTION

The present invention relates to a vending or dispensing system for both storing and dispensing liquid in metered quantities following the insertion of a coin or token into a vending station, included in the system. The system includes a recirculation system to constantly recirculate the bulk liquid between the vend stations and a storage tank, a safety control means which prevents dispensing of the liquid after a power failure and resumption of power if the time period of the power failure exceeds a predetermined time limit based on ambient temperature and the product perishability, and a thermostatic control means which shuts down the system should the liquid in the storage tank exceed a predetermined value. One feature of the system of the present invention is a means for closing down the system when a predetermined high or low level of stored liquid is reached.

Another feature of the system includes a cleaning and sanitizing unit which automatically dispenses various amounts of cleaning solution and wash water to clean and sanitize the system prior to its being refilled with liquid.

Among the objects of the present invention are the provision of a system for storing bulk liquid and dispensing said liquid in metered quantities on demand; a bulk liquid storing and dispensing system which recirculates the liquid to all vend stations, each productive of a constant head pressure with the liquid being constantly recirculated from each station through a bulk storage unit; the provision of a bulk storing and dispensing system including a means for closing down the system upon an extended power failure or upon the stored liquid reaching a temperature above a predetermined value; the provision of a bulk storing and dispensing system including a means for determining a high or low level point of stored liquid and the provision of a bulk storing and dispensing system having a cleaning and sanitizing unit to automatically clean the system when it is empty of the bulk liquid.

These and other objects, features and advantages of the invention will be apparent from the following description when viewed with the accompanying drawings.

DESCRIPTION OF THE PREFERRED EMBODIMENT

Figure 1:
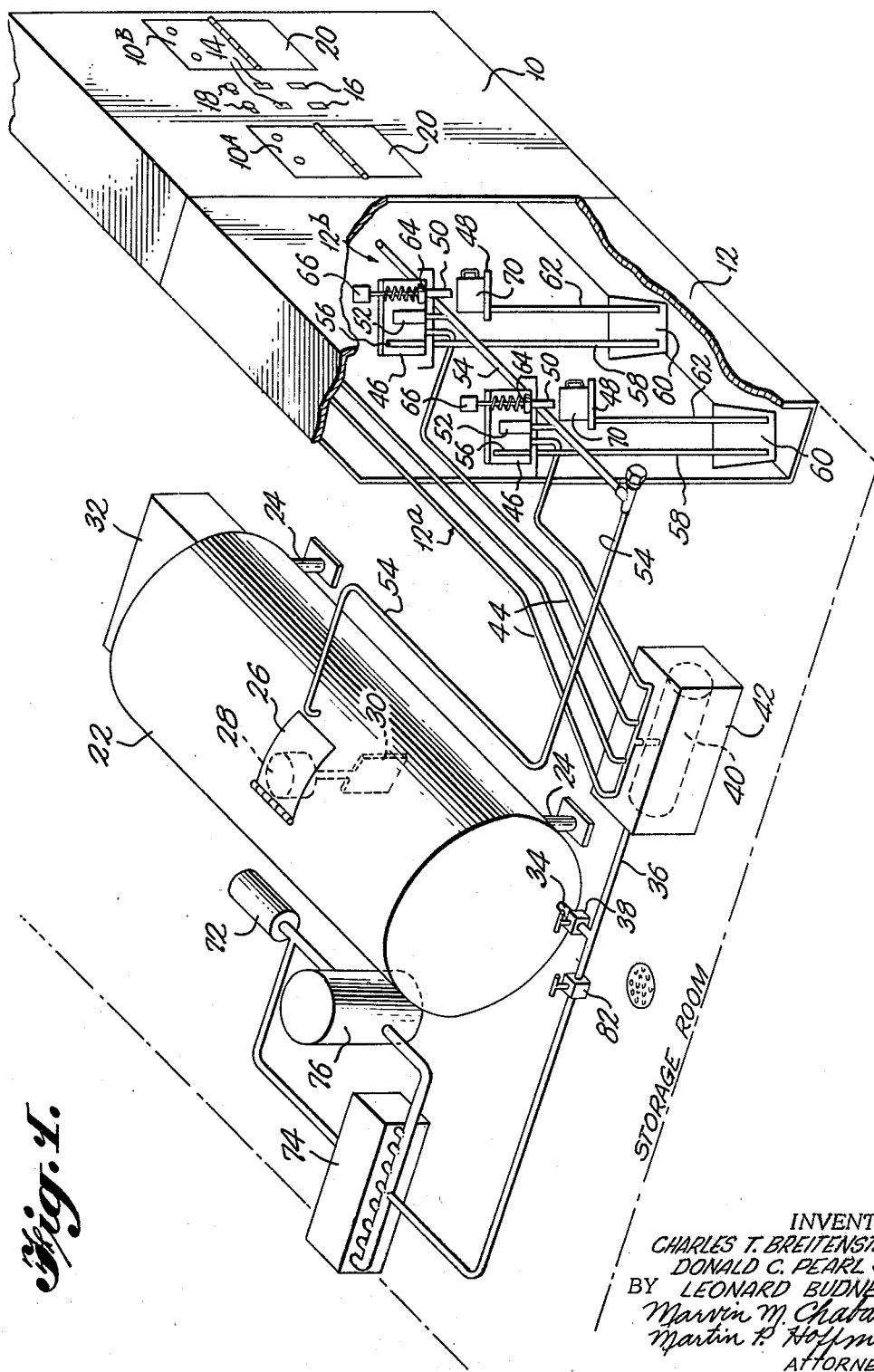
FIGURE 1 is a schematic view, partly in section, of the dispensing system of the present invention.

Referring to FIGURE 1, the bulk milk dispensing system is shown schematically housed within a storage room. The system comprises two dispensing machines 10 and 12; each dispensing machine preferably includes two vending stations that are fitted into openings in the surface of the outside wall of the storage room for access by the customer. A fill station, a counter panel, which is preset for governing an assigned number of vends, a Ready to Vend indicator lamp, and a key switch (not shown in FIGURE 1) are also located on the outer wall of the storage room. Other components of the system are located within the storage room and are subject only to servicemen and the like having access to the system. Dispensing machine 10 provides two vend stations 10a and 10b. Dispensing machine 12 is illustrated with its front panel cut away and shows schematically the dispensing outlets and piping connections of two vend stations 12a and 12b. The front panel of each dispensing machine includes a token or coin slot 14, a coin return 16 and a push button operated switch 18. The front panel also includes a vend door 20 for access to the dispensing outlets. Common to all stations in a dispensing machine, in addition to the machine housing and vend panel, are portions of the control circuit of FIGURES 2–5.

The dispensing machines 10 and 12 are supplied with milk or other liquid from a storage tank 22. In such a system, tank 22 may supply and service two, four or six vending stations, there being two stations to each dispensing machine. The size of the tank 22 in use in any specific system is dependent on the number of vend stations fed from the tank. In systems of the type contemplated herein, tank 22 may have from 150 to 500 gallons capacity, as necessary. Such tanks are well known and generally used in the bulk milk handling field. These tanks may be cylindrical, or oval in cross section, lined with material (usually stainless steel) suitable for storing potable liquids such as milk. Tank 22 is insulated and refrigerated to keep the stored liquid cool for intermediate length periods. Tank 22 stands on supporting legs 24 and has a hinged top cover 26 allowing access to the tank interior for cleaning. A motor 28, mounted to the cover 26, drives a stirrer 30 to agitate the liquid within the tank to provide uniformity of temperature throughout the tank contents. The tank has is own air-cooled refrigeration unit 32 mounted thereto for maintaining the tank interior at a suitable cool temperature, such as 40° to 45° Fahrenheit. The tank also has a fill connection complete with valve (not shown) for connection to the fill station on the storage room wall to accept refills of liquid periodically.

At the tank sidewall near its bottom edge, an outlet pipe 34 connected to pipe 36 through manually operated valve 38 transfers liquids from the tank through a pump 40 within manifold chamber 42 to a set of hoses 44 (one hose per vending station). These hoses preferably are of rigid plastic material adapted for carrying potable liquids. Such hoses are constructed and connected in a manner allowing ready replacement as necessary.

Each hose is connected individually to an overhead reservoir 46, there being one reservoir 46 within the dispensing machine for each vend station. Each station has a vend recess or platform 48, and a dispensing system including a feed tube 50 for gravitational feed (valve controlled) from the reservoir 46 toward the platform at that station.

Each reservoir 46 forms a rectangular section, small capacity (approximately 5 gallons) enclosed tank. Connected into the base of each reservoir 46 is a separate one of the supply hoses 44. These multiple hoses transfer the liquid output of pump 40 to each of the overhead reservoirs 46.

Within each reservoir 46 is a first standpipe 52. This standpipe is open to the interior of the reservoir a predetermined distance above the base of the reservoir 46. Thus, when the level of liquid in a reservoir reaches the top of the standpipe 52, the liquid passes into the standpipe and out common return line 54 to flow back into the top of tank 22. An emergency standpipe 56 is positioned in each reservoir at a higher level than the recirculating standpipe 52. Standpipe 56 is connected to a drain hose 58, which is in communication with a refuse bucket 60. Bucket 60 is hidden within each station below platform 48 to receive, in addition to emergency flow, excess or waste liquid dumped onto platform 48 through waste line 62. The platform 48 may be mesh or grating (not shown) to pass waste liquid to line 62. Associated with waste bucket 60 may be a weight responsive shut-off switch (not shown) to inactivate the station when an excess of waste material has accumulated in its associated waste bucket.

Within the base of each reservoir 46 is a valve 64, operated by solenoid 66 to open and normally biased by the action of compressor spring 68 on the valve plunger to maintain the valve in a closed condition. When in the closed position, valve 64 prevents the outflow of liquid from the reservoir through the feed tube 50. When energized, solenoid 66 raises the valve plunger from its valve seat to release liquid flow through feed tube 50. It is expected that a user will place a suitable container 70 on the platform 48 to receive the liquid flow before activating the dispensing means at that vend station. Solenoid 66 is timer controller to release a metered quantity of liquid at the constant head pressure effected within the reservoir.

Periodically the system must be cleaned and sanitized, if not sterilized, to maintain the dispensed liquid in a fresh, uncontaminated condition. A sanitizing network is built into the system. The network includes a sanitizing pump 72 for feeding cleaning liquid from a storage means 74 and water from a tank 76 through feed line 78 to the tank 22 and from the tank through the normal dispensing system. The bulk dispensing system may be drained by means of valve 82 which may be manually or automatically operated, as will be outlined in detail later. The control of the sanitizing process may be automatic as will be explained with respect to the circuit of FIGURES 2–4.

Figure 2:
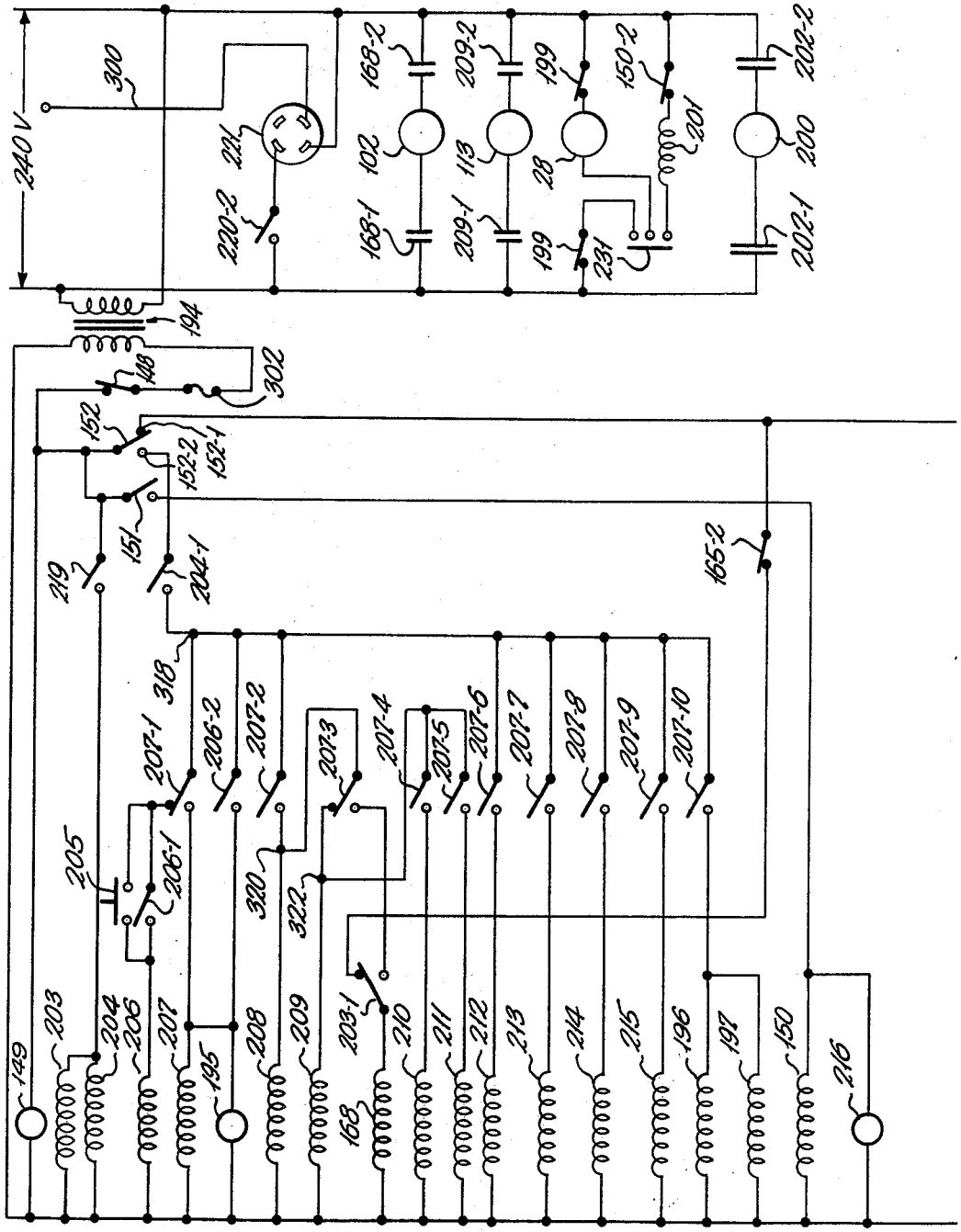
FIGURES 2 to 4 combine to form a schematic circuit diagram of the control apparatus of the system.
Figure 3:
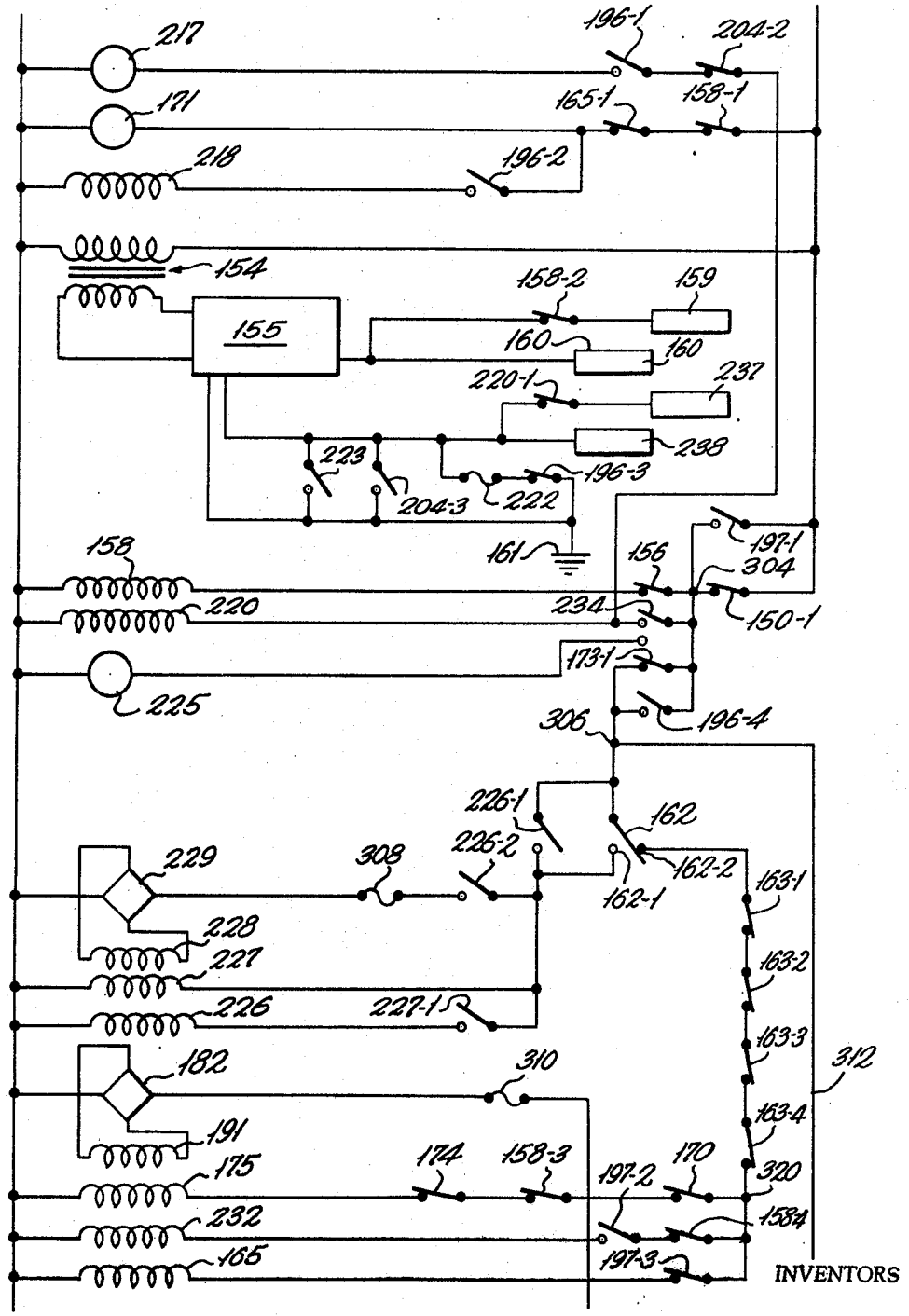
Figure 4:
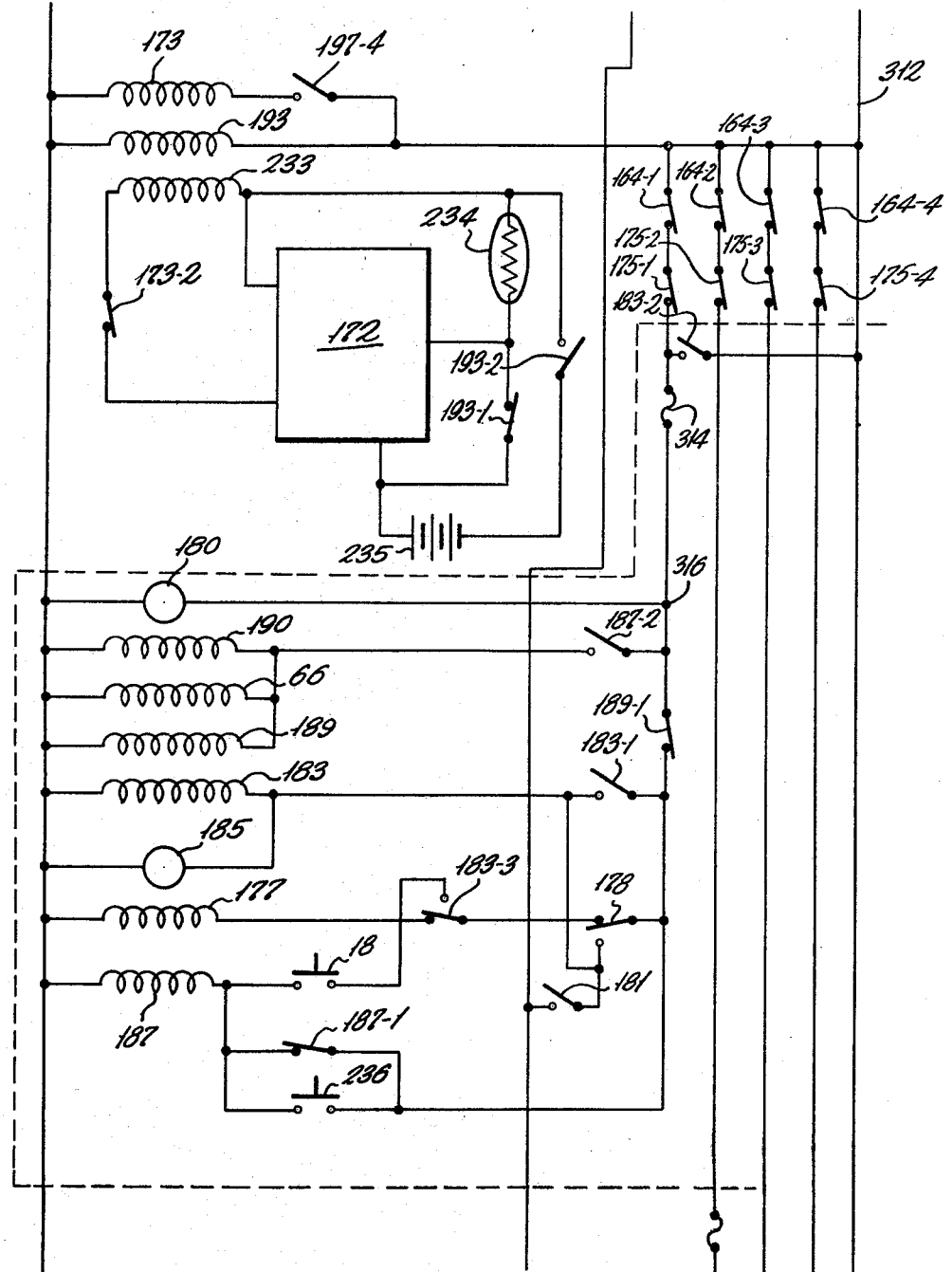

The electrical controls of the bulk milk dispensing system are illustrated in FIGURES 2–4. A 240 volt AC source supplies power to a refrigeration compressor 200, which is in series with a pair of pressure control contacts 202–1 and 202–2, an agitator motor 28 in series with a service toggle switch 199 and a normally open contact of a thermostat 231, a water pump motor 113 in series with water pump relay contacts 209–1 and 209–2 and a circulator pump motor 102 in series with the contacts 168–1 and 168–2 of a circulator pump motor contactor. A power outlet 221, adapted to supply power to a milk delivery truck, is in series with a fill pump relay contact 220–2 across the 240 volt supply source. The outlet 221 also includes a 120 volt connection at line 300.

The remainder of the control system is powered by a 120 volt supply provided by a step down transformer 194, the primary of which is coupled to the 240 volt supply. A 10 amp fuse 302 and a main power switch 148 are in series with the 120 volt secondary winding of the transformer 194. An indicator lamp 149, also connected across the 120 volt winding of the transformer 194, indicates the power is "on." A switch 152 includes a vend and fill position at contact 152–1 and a clean-in-place (CIP) contact 152–2. With the switch 152 in the vend and fill position, the system is in the standby position. The standby circuit includes a circulator pump motor contactor 168, in series with pump drive relay contact switch 203–1 and circulator relay contact 165–2, which is connected across the 120 volt supply. Also connected across the supply is a ready-to-vend indicator lamp 171 in series with circulator relay contact switch 165–1 and low level relay contact switch 158–1. A level control transformer 154, powered by the 120 volt supply, supplies the level control circuits of the system which include a solid state liquid level control 155. This control 155 is coupled to a low level electrode 159 in series with low level relay contact 158–2 and low level electrode 160. The level control circuit 155 is also coupled to a high level electrode 237 in series with a fill pump relay contact switch 220–1 and a high level electrode 238. The high level electrodes are connected to the storage tank ground 161 through a removable link 222 in series with a latch relay contact switch 196–3. A pump position relay contact switch 204–3 and a milk valve contact switch 223 are also in parallel with link 222 and contact 196–3 between the ground 161 and the high level electrodes. In addition in the standby condition, a low level relay 158 in series with a low level control reed switch 156 is connected to the AC supply through the parallel circuit comprising a normally closed refrigeration relay contact 150–1 and normally open latch relay contact switch 197–1 at junction 304.

Junction 306 which is coupled to junction 304 and the primary of the AC supply transformer 194 through latch relay contact switch 173–1 connected in parallel with latch relay contact switch 196–4 which supplies power to a line relay 193. A circulator pump relay 165 is in series with latch relay contact switch 197–3, and is connected to junction 320 and high level pressure switches (in each waste container) 163–1 and 163–4 and fill station door switch 162. Also connected to the power supply at junction 320 is a vend station relay 175 in series with a vend-on-off key switch 174, a low level relay contact 158–3 and a normally closed predetermined counter switch 170.

In addition to the components of the control circuit described which are energized in the standby condition, the control circuit includes a pump drive relay 203 in parallel with a pump position relay 204 which are connected to the AC supply source through a pump position switch 219. A refrigeration relay 150 and a dump indicator lamp 216 are also connected to the power source through a 50° thermostat switch 151 which is adapted to close if the liquid within the storage tank 22 exceeds 50° in temperature. A release coil 218 related to latch relay 196 is in series with normally open latch relay contact 196–2 and it is connected in parallel across the ready-to-vend indicator lamp 171. A fill pump relay 220 in parallel with ready-to-fill indicator lamp 217, which is in series with a normally open latch relay contact switch 196–1 and a normally closed pump position relay contact 204–2, are connected to junction 304 by means of a normally open high level control reed switch 234. Also connected to junction 304 is a reset indicator lamp 225 in series with normally closed latch relay contact switch 173–1. A latch relay release coil 232 in series with normally open latch relay contact switch 197–a and low level relay contact switch 158–4 is also connected to junction 306 through the high level pressure switches 163 and the fill station door switch 162. Latch relay 173 in series with normally open latch relay contact switch 197–4 is in parallel with line relay 193.

A delay drop out safety control circuit includes a release coil 233 of latch relay 173 in series with latch relay contact 173–2 which is connected to a delay drop out safety control 172. A battery 235 is in series with a normally open line relay contact 193–2 which is connected across a thermistor 234 and a normally closed line relay contact 193–1, which in turn, are connected to the safety control 172.

A predetermined counter reset circuit is connected to the AC supply at junction 306 through contact 162–1 of door switch 162. With the door switch at the fill station opened, a circuit is completed from junction 306 through contact 162–1 to a reset timer motor 227. Connected in parallel across the motor 227 is a reset relay 226 in series with a reset motor limit switch 227–1. A reset relay contact 226–1 in parallel with the fill station door switch 162 locks in the predetermined counter reset circuit when reset relay 226 is energized. A bridge rectifier 229, which supplies DC power to a predetermined counter reset coil 228, is in series with a one amp fuse 308 and a normally open reset relay contact 226–2 and is connected to the AC supply junction 306 through contact 226–1. The predetermined counter advance circuit comprises a bridge circuit 182, which supplies a counter advance coil 191. This circuit is fused by a one amp fuse 310 and is connected in series with the token switches in the vend stations. The counter advance coil 191 is adapted to be momentarily energized when a token is dropped into a vend station slot 14 as will be described hereinbelow.

Only the control circuit of one of the vend stations, for example station 10a is illustrated in FIGURE 4 for the sake of clarity. The other vend station control circuits are identical to that illustrated and connected in parallel. As such, it will be appreciated that the operation of one vend station control circuit is identical to that of another.

The vend station control circuit is connected to the AC source of supply at junction 306 through line 312 by means of normally closed low level pressure switch 164–1 and normally closed vend station relay switch 175–1. The circuit is fused by a three amp fuse 314 and with the switches 164–1 and 175–1 in the closed position, an AC potential is present at junction 316. An indicator lamp 180 is connected to the AC source at junction 316 to indicate the vend station is "on." A parallel circuit comprising vend counter coil 190, vend solenoid 66 and vend timer motor 189 is connected in series with normally open vend relay contact switch 187–2 to the AC junction 316. A token relay 183 and a token deposited lamp 185 are adapted to be connected to junction 316 by means of a momentary contact upper token switch 178 and a vend timer limit switch 189–1. A normally open token relay contact 183–1 is connected in parallel across the upper token switch to lock in the token relay 183 after the token switch 178 has reopened. A vend relay 187 is connected to the AC supply by means of a vend push button switch 18 in series with token relay contact 183–3 and normally closed upper token switch 178. A vend relay contact 187–1 is provided to lock in the vend relay after the vend push button switch 18 has been released. A push button switch 236 is connected in parallel to the AC supply with the vend relay contact 187–1 to provide a means to test the entire vend station circuitry without having to deposit a token in the slot. A token reject coil 177 is connected through normally closed token relay contact 183–3 and the upper token switch 178 to the AC supply.

A lower momentary contact token switch 181 completes a circuit from the AC source of supply through rectifier 182 to the predetermined counter coil 191 in the control panel circuit.

A circuit is provided to automatically dispense and circulate the cleaning and sanitizing fluids throughout the system. This clean-in-place (CIP) circuit, is connected to the AC source of supply through switch 152, when it is in the clean-in-place position, contact 152–2, and normally open pump position relay contact switch 204–1. A series of cam operated switches 207–1 to 207–10 connected in parallel to the pump position relay contact 204–1 at junction 318 are driven by a timer motor 207 and are adapted to selectively energize the relays or solenoids in series with the respective switches to introduce various cleaning fluids into the system from the storage means 74. A clean-in-place relay 206 is connected to the AC supply at junction 318 by means of a CIP start push button 205 and cam switch 207–1. A CIP relay contact switch 206–1 is connected in parallel with the start push button 205 to lock in relay 206. A second CIP relay contact switch 206–2 completes a circuit to the AC source of supply through CIP timer motor 207 and a CIP indicator lamp 195. Cam switch 207–2 is in series with a drain valve solenoid 208 across the AC supply. Cam switch 207–3 is in series with a water pump relay 209 in its normally closed position and in series with the motor contactor 168 through pump drive relay contact 203–1. Cam switch 207–3 is coupled to cam switch 207–2 at junction 320. Cam switch 207–4, in series with cold water solenoid valve 210 and cam switch 207–5 in series with hot water solenoid valve 211, are in parallel and are coupled to the cam switch 207–3 at junction 322.

The CIP timer cam switches 207–6 through 207–9 are connected in a parallel circuit to the alkali solenoid valve 212, and acid solenoid valve 213, a chlorine solenoid valve 214, and a mikroklene solenoid valve 215 respectively. Cam switch 207–10 is connected in series with latch relay 196 and latch relay 197 which are in parallel.

The operation of the system may be described as follows. After the system has been cleaned and sanitized, and when the bulk storage tank is empty, it is ready to be filled with a liquid for human consumption such as milk. With the system controls connected across the 240-volt supply, and the main power switch 148 in its closed position, the step down transformer supplies a 120-volt output across its secondary winding, and the power-on lamp 149 is energized. With the switch 152 in the vend and fill position at contact 152–1, the line relay 193 and the level control transformer 154 are energized. The transformer 154 supplies power to the solid state liquid level control 155 to close the high level control reed switch 234 and to energize fill pump relay 220 through latch relay switch 197–1. Contact switch 220–1 of the fill pump relay is closed and the high level electrodes 237 and 238 become sensitive. The ready-to-fill lamp 217 is also energized through the closed latch relay contact switch 196–1, and contact switch 204–2 of the de-energized pump position 204, designating to the operator of the delivery tank truck that the storage tank may be filled. A fill station (not shown) includes a fill port for delivering liquid from a tank truck to the bulk storage system. Contact 220–2 of the fill pump relay 220 closes to connect the truck outlet 221 at the fill station, which supplies power to operate the tank truck pump, to the 240-volt supply.

A predetermined counter, comprising the predetermined advance coil 191, the reset coil 228, reset timer motor 227, reset relay 226, and switch 170, is located at the fill port. Opening of the fill station door completes a circuit to the timer motor 227 through contact 162–1 of the door switch 162. Reset relay 226 is also energized, closing its contacts 226–1 and 226–2. Through contacts 226–2 a circuit is completed through rectifier 229 to counter reset 228 to prepare the counter for operation. At the end of a 3-second delay in operation, motor switch 227–1 opens de-energizing relay 226. Relay 226 on de-energization opens switches 226–1 and 226–2. On release of switches 226–1 and 226–2, the counter operates to subtract one unit count from the set total. Thus for each vend, the coil 191 will subtract one count from the counter. When the counter reaches the zero position, the counter switch 170 opens to shut down the vend stations.

As liquid is being pumped into the storage tank, it reaches the low level electrodes 159 and 160. Upon reaching the upper low level electrode 160, a circuit in the level control 155 operates to close the low level control reed switch 156, which in turn energizes low level relay 158 and closes the low level relay contact switches 158–1 to 158–4. The ready-to-vend lamp 171 is energized through contact switches 158–1 and 165–1 to provide an indication there is a sufficient quantity of liquid in the system to supply the vend stations.

When the liquid reaches the upper high level electrode 238, the level control 155 operates to open the high level control reed switch, which de-energizes the fill pump relay 220 to extinguish the ready-to-fill indicator 217 and to open the 240-volt supply line to the truck outlet 221, thereby stopping the truck pump. With relay 220 de-energized, switch 220–2 is open and the system is in condition for vending. The pump relay 220 remains de-energized until the tank 22 is emptied and cleaned.

A feature of the system is the anti-chatter differential of the level electrode pairs. For example, as liquid is pumped into the storage tank 22 and makes contact with the lower end of electrode 159, the circuit is still inoperative until electrode 160 is reached. On the other hand, when the liquid level falls below electrode 160, the circuit remains closed until the liquid level falls below electrode 159, then the circuit is broken. This prevents an "on-and-off" action due to splashing of liquid in the tank, making an intermittent contact with the lower electrode 159. This arrangement is also employed for the high level liquid control electrodes 237 and 238, however with converse results.

Should the temperature of the liquid in the storage tank 22, while it is being pumped from the delivery truck or at any other time during its storage, exceed 50° Fahrenheit, the thermostat 151 will close to energize the refrigeration relay 150 and illuminate the dump indicator lamp 216. The refrigeration relay contact switch 150–1 opens the AC supply to the vend stations while contact switch 150–2 opens the circuit to the refrigeration solenoid valve 201.

After the tank 22 has been filled, closing of the fill station door switch 162 energizes the circulator pump relay 165. Circulator relay contact switch 165–1 closes, illuminates the ready-to-vend lamp 171 while contact switch 165–2 completes the circuit to energize the circulator pump motor contactor 168, whose contact switches 168–1 and 168–2 in turn are closed and connect the circulator pump motor 102 across the 240-volt supply.

When the vend on-off switch 174 is turned to the "on" position by means of manually inserting a key and turning it, the vend station relay 175, in series with the vend switch 174 and low level relay contact switch 158–3, and predetermined counter switch 170 is energized, thereby closing the vend station relay contact switches 175–1 to 175–4 (one for each vend station) and energizing the vend stations including the vend station "on" indicator lamps 180. The token reject coil 177 is also energized through normally closed side of the upper token switch 178 and the normally closed token relay contact switch 183–3.

The pump motor 102 drives the pump 40 which pumps liquid out of the tank 22 through pipe 36 and the hoses 44 to each reservoir 46 in the vend stations and recirculates it back to the tank through the return line 54. The pump and motor assembly has two sets of pulleys (not shown) to provide two speed ranges. A low speed of approximately 1400 r.p.m. for the vend cycle and a high speed of approximately 3600 r.p.m. for the cleaning and sanitizing cycle are provided. The pulley belts are manually positioned on the required set of pulleys and a sensing switch, connected to the assembly, controls a circuit to the pump motor to insure operation of the pump at low speed for the vending cycle and high speed for the cleaning and sanitizing cycle.

When each reservoir 46 is filled, the excess liquid spills into the standpipe 52 and out the common return line 54 back into the storage tank 22. The circulator pump unit operates continuously during the standby condition to circulate the liquid between the storage tank 22 and the vend stations in the dispensing machines, thereby insuring a fresh supply of liquid at each vend station.

Should an abnormal amount of liquid accumulate in the reservoir 46 of a vend station, for a reason such as the blockage of the return line 54 or because of an excess of liquid being pumped into the reservoir, the excess liquid will spill into a standpipe 56 and accumulate in the waste bucket 60. After a predetermined amount of liquid accumulates in the waste bucket, two stage pressure switches (one for each waste bucket) comprising low level pressure switches 164–1 to 164–4 and high level pressure switches 163–1 to 163–4, which are operated in the waste bucket, are actuated. Should only a moderate amount of waste liquid accumulate in the waste bucket, one of the low level switches 164 will break the circuit to the vend station when the liquid reaches one level in the waste bucket. In this condition, the remainder of the vend stations continue to operate in a normal manner. However, when a higher level of liquid is reached in the waste bucket, one of the high level pressure switches 163 will break the circuit for the whole system. More specifically, opening of one of the low level pressure switches 164 merely opens the supply circuit to that particular vend station. Opening of one of the high level pressure switches 163 de-energizes the vend station relay 175 to open the supply circuit of all of the vend stations and de-energizes the circulator pump relay 165 which in turn opens its contact switches 165–1 and 165–2 to de-energize the ready to vend lamp 171 and the circulator pump motor contactor 168 to shut down the circulator pump motor 102.

In order to maintain the liquid within the storage tank at a uniform predetermined temperature, the storage tank is provided with an agitator 30 to mix the liquid in the tank together. One remote end of the tank includes a normally closed thermostat 231 which is adapted to close when the liquid at that point rises above the critical operating point of the thermostat. The thermostat contacts then complete a circuit to energize the agitator motor 28 and the refrigeration solenoid valve 201. The refrigeration compressor 200 is also actuated, and in this manner the liquid in the tank is cooled, circulated and maintained at the cool temperature (approximately 38° Fahrenheit).

When a customer desires to purchase milk, he places his container on the vend station platform and inserts a token in the slot 14. The token momentarily transfers the upper token switch 178 to complete a circuit through token relay 183 and the token deposited indicator lamp 185. Token relay contact switch 183–1 in parallel with the upper token switch 178, provides a lock-in circuit for the token relay 183. Contact switch 183–2, in parallel with the vend station relay contact switches 175 and low level pressure switch 164, locks-in the vend station to the AC power supply. Contact switch 183–3 operates to deenergize the token reject coil 177. The token then closes the lower token switch 181 which applies a signal to the predetermined counter advance coil 191, to subtract one count from the preset counter. The token then travels to the token collection box (not shown).

Depressing the vend push button switch 18 energizes the vend relay 187 through token relay contact switch 183-3 and the reclosed upper token switch 178. Vend relay contact switch 187-1 locks-in the vend relay to the AC supply at junction 316. Vend relay contact switch 187-2 completes the circuit to the vend counter 190, the vend solenoid 66 and the vend timer motor 189. The vend counter 190, which indicates the total number of vend operations, operates to shown one vend cycle. The vend solenoid 66 energizes and lifts the overhead reservoir valve 64 from its seat to permit a flow of liquid to the customer's container. The vend timer motor governs the volume of liquid dispensed by opening the vend timer limit switch 189-1 after a predetermined time to deenergize the vend relay 187 which in turn deenergizes the vend solenoid 66. The compressor spring 68 then returns the valve 64 back to its original position to stop the flow of liquid. The customer removes his container, and the vend station is ready for the next vend cycle.

The delay drop out safety control circuit provides an important safety feature which is built into the system to control vending of liquid after a power line failure and a resumption of power. In case of a power line failure, line relay 193 deenergizes and line relay contact switch 193-1 opens while contact switch 193-2 closes, thus beginning a timing period. The length of the timing period is determined by the delay drop out safety control 172 and the thermistor 234. The higher the ambient temperature, the shorter the time period before the safety control 172 will operate to close down the system because of product perishability. If the time of the power failure is less than the period of the safety control unit 172, then the resumption of power will energize the line relay 193, which resets the safety control 172 back to its normal condition. However, if the time of the power failure exceeds the safety control limitations, then latch relay release coil 233 is energized and contact switch 173-1 opens to disable the vend stations and the line relay 193 can not be reenergized. Contact switch 173-2 is opened to insure the latch relay release coil 233 is not reenergized. The reset indicator lamp 225 is energized through contact switch 173-1 to indicate to service personnel that corrective action is required.

When the liquid in the storage tank 22 falls to a level below the low level electrodes 159 and 160, low level control reed switch 156 opens to deenergize the low level relay 158. Contact switch 158-1 opens to extinguish the ready to vend lamp 171. Contact switch 158-2 opens in the low level electrode 159 circuit, thus preventing resetting of the reed switch 156 until the liquid level reaches the higher low level electrode 160. Contact switch 158-3 opens to deenergize the vend station relay 175 which in turn disengages the vend stations from the AC supply. Contact 158-4 opens the latch release coil 232 circuit.

The vending sequence may be repeated until one of four conditions arise: (1) the predetermined counter is advanced to the zero position, at which time counter switch 170 will open to deenergize the vend stations through the vend station relay 175; (2) the liquid level in that tank falls below the low level electrode 159 as described above; (3) the low level pressure switch 164 in a particular vend station is opened; or (4) a high level pressure switch 163 is opened. During the first three conditions, the circulating pump motor 102 remains energized, however, during the last condition it is stopped.

After the storage tank has been emptied, it must be cleaned and sanitized prior to being refilled. The clean-in-place (CIP) timer motor 107 and the cam switches 107-1 to 107-10 operate the various CIP system valves and pumps. The entire CIP system can be programmed for 48 minutes, plus the manual time required for removing and cleaning various components which can not be cleaned in the automatic operation.

Figure 5:
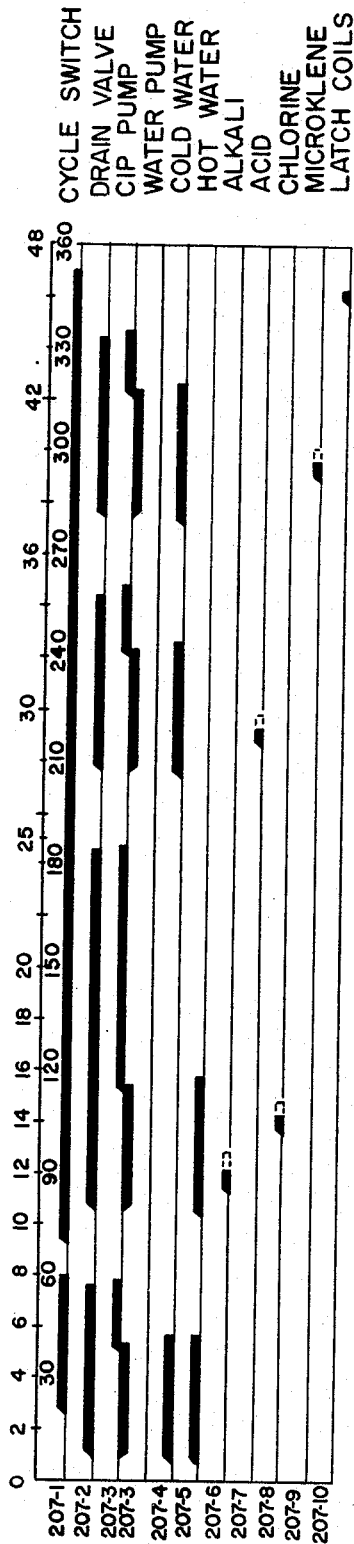
FIGURE 5 is a chart of the operation of the clean and sanitize operation of the system.

Referring to FIGURE 5, a graphic illustration is seen of the program of the timer motor cam (not shown) including the duration and relative relationship of the closing of each of the cam switches 107-1 to 107-10.

Any liquid remaining in the storage tank is drained by means of manually actuated valves 38. The vend reservoirs 46 are also removed and a set of connecting loops are applied between the supply manifold 44 and the return manifold 54. Also the belt driving the circulator pump motor 102 is placed on a second set of pulleys to increase the pump speed from approximately 1400 to 3600 r.p.m.

The switch 152 is changed from the vend and fill position to the CIP position, the main power switch 148 is turned on, and the pump position switch 219 is closed.

The CIP start switch 205 is depressed to start the cycle which energizes the CIP relay 206. Contact switch 206-1 provides a lock-in circuit for the CIP relay 206 through cam switch 207-1. Contact switch 206-2 closes to energize the CIP timer motor 207 and lamp 195 is illuminated. Cam switches 207-4 and 207-5 close to energize the hot and cold water solenoids 210 and 211, thereby allowing the water to enter the storage tank 22. Cam switch 207-2 closes to energize the drain valve solenoid 208 which closes the drain valve 82. Closing of cam switch 207-2 also completes a circuit to water pump relay 209 through cam switch 207-3 to close contact switches 209-1 and 209-2 which energize the water pump motor 113. Cam switch 207-1 then closes to de-energize CIP relay 206 and to directly energize CIP motor 207 through its contact. The next step of the timer motor cam closes cam switch 207-3 to energize the pump motor contactor 168 through closed contact switch 203-1. Contact switches 168-1 and 168-2 close to operate the circulator pump motor 102 which circulates water through the system. Cam switch 207-2 then opens after a predetermined time to de-energize the valve solenoid 208 and to drain the water from the system.

As can be seen from the CIP cam operation graph, the initial cleaning phase ends. The manual phase then begins which allows time for cleaning of all the components not washed by the automatic operation.

After the required manual cleaning, the CIP push button switch 205 is again manually depressed to energize the CIP relay 106 and CIP motor 107 circuits as described above. Cam switch 207-5 closes to energize the hot water solenoid which allows hot water to enter the tank while cam switch 207-2 operates to close the drain valve. Cam switch 207-3 operates the water pump relay to operate the water pump motor 113.

At this point cam switch 207-6 closes to energize the alkali valve solenoid 212 and a small amount of alkali solution is added to the hot water. After a period of time, cam switch 207-8 then closes to operate the chlorine valve solenoid 214 which adds the chlorine solution to the hot water. At this point cam switch 207-3 operates the circulator pump motor 102.

After the water and added solutions have been circulated throughout the system, cam switch 207-2 opens to de-energize the drain valve solenoid 208 to drain the water from the system. At this point all of the cam switches are open except 207-1. Cam switch 207-4 then closes and the cold water solenoid valve 210 opens to add cold water to the system, while cam switch 207-2 closes to close the drain valve. Cam switch 207-3 operates water pump relay 209 and operates the water pump motor 113 to pump the cold water into the system.

At this time cam switch 207-7 closes to energize the acid valve solenoid 213 which adds an acid solution to the cold water. Cam switch 207-3 operates the circulator pump motor 102, circulates the water and acid solution through the system. After the water is circulated, cam switch 207-2 de-energizes the drain valve solenoid 208 and the water drains from the system. Again at this point all of the cam switches, except switch 207–1, are open and the system is drained.

Cam switch 207–4 again closes and cold water is again added to the system through the cold water solenoid valve 210. Cam switch 207–2 closes to shut the drain valve. Cam switch 207–3 operates the water pump relay 209 and water pump motor 113 to pump the water into the system and to subsequently operate the circulator pump motor 102 to circulate water through the system.

At this point cam switch 207–9 closes and the mikroklene valve solenoid valve 215 is energized to add mikroklene solution to the cold water. Cam switch 207–2 again opens to de-energize the valve solenoid 208 to drain the water from the system. At this point the system is cleaned and sanitized and ready to be filled.

In the last step of the cam program operation, cam switch 207–10 closes to energize latch relay coils 196 and 197. Contact switches 196–1, 196–2 and 196–4 close while contact switch 196–3 opens. Contact switches 197–1, 197–2, and 197–4 close while contact switch 197–3 opens. These switches are mechanically held in these positions after the latch relays 196 and 197 are de-energized.

After the clean-in-place operation, the switch 152 is returned to the vend and fill position at contact 152–1, and the system is ready for filling.

Within the system as described, a number of safety features are provided as follows:

As one of these, there is provided a second milk temperature control system controlled by thermostat 151. This thermostat is provided in addition to the normal refrigerating cycle control thermostat 231. Both thermostats physically are attached to the inner shell of the storage tank 22 to sense the temperature of any liquid remaining in the tank, although they are not in contact with the liquid. Thermostat 231 controls the refrigerating system cycling to maintain the liquid at the proper operating temperature level. The second thermostat 151 is used as a high temperature shut-off. Thermostat 151 remains open at temperatures below 50° Fahrenheit and will close to shut down the system only when high temperature liquid is pumped into the storage tank or when the temperature of liquid in the tank rises above 50° Fahrenheit. Thermostat 151 may require manual resetting or the like once it has opened.

Within the temperature cycle or refrigeration system, a sensor (not shown) is used to sense the pressure of the refrigerant recirculating within the refrigerating system and cooperate with thermostat 231. With the refrigeration system inactive, the sensor indicates low pressure and switches 202–1 and 202–2 are open. When cycling thermostat 231 closes (on a high temperature condition arising) refrigeration solenoid 201 closes to apply pressure to the refrigerant and the compressor operates. When the temperature drops below that for which thermostat 231 is set, solenoid 201 is de-energized, however the compressor will continue to operate until the sensor drops past its setting opening switches 202–1 and 202–2. Such controls are well known in the refrigerating arts.

Another safety feature includes the interaction of milk valve contactor switch 223 and manually operated valve 38, the position of which determines whether milk is drained from the tank or allowed to recirculate. If the valve 38 is left in the drain position inadvertently or otherwise, the switch 223 cannot operate. With switch 223 inoperative, pump relay 220 cannot be energized and the tank cannot be filled. When the valve 38 is returned to the non-drain position, switch 223 is operated and allows the tank to fill. By the use of this switch, a supply of milk cannot accidentally be pumped into the drain, thereafter causing malfunction of the system completely.

Further, the latch relays 196 and 197 cannot be actuated once a santizing cycle is initiated. These relays latch in a position maintaining the vend circuits open at the start of a sanitizing cycle and remain until they are electrically released by the conclusion of the sanitizing cycle. Thus, once the sanitizing cycle has been started, it must be completed before these relays will release to allow vending to occur. Along with this feature, there has been provided a safeguarding link 222 which is located in series with the latch relay contact switch 196–3. With the link in place, the circuit to the level control system is activated only through the latch contact switch 196–3. Removal of the link allows the vend system to be activated without the completion of the sanitizing cycle. The link provides a visible indication as to whether the sanitizing cycle is utilized. The link may be physically locked and sealed such that its removal can be clearly shown as the cause of any possible problems which could arise.

It will be apparent that many changes and modifications of the several features described herein may be made without departing from the spirit and scope of the invention. It is therefore apparent that the foregoing description is by way of illustration of the invention rather than limitation of the invention.

What is claimed is:

1. A system for storing and dispensing liquid suitable for human consumption comprising a first storage means for maintaining a supply of liquid, a plurality of vend stations, each of said vend stations including a second storage means for maintaining a smaller quantity of liquid; means for recirculating said liquid between said storage means and said second storage means at said vend stations to provide a constantly recirculating supply of liquid at said end stations said second storage means including an inlet for said liquid and a valve operated outlet for dispensing a measured quantity of said liquid directly from said second storage means in response to the insertion of a token at a vend station by a customer.

2. The system of claim 1 wherein said means for dispensing includes valve means adapted to open and dispense measured amounts of liquid and control circuit means including a solenoid to open said valve means in response to the insertion of a token and timer circuit means to energize said solenoid to maintain said valve means open for a preset time period to dispense a predetermined quantity of liquid.

3. The system of claim 1 further including counter means adapted to control the total number of dispensing operations for a given amount of liquid stored in said first storage means, said counter means including means to subtract one count for each dispensing operation until a preset number on the counter means is reduced to zero and further including switch means to deenergize said vend stations when said preset number reaches zero, said subtracting means including a solenoid coil and second switch means adapted to close to energize said solenoid coil in response to the insertion of a token at a vend station by a customer.

4. The system of claim 1 wherein said first storage means further includes a pair of low level electrodes for detecting a low level condition and a pair of high level electrodes for detecting a high level condition, each of the electrodes in said pairs being spaced relative to each other, circuit means operative in response to a detected high or low level condition to provide signals representative of either of said conditions, said circuit means including means requiring actuation of both of said spaced electrodes of each of said pair of electrodes to render said circuit means operative thereby preventing operation of the circuit due to slight changes in the level of said liquid in either the high or low level condition.

5. The system of claim 1 further including waste disposal means and wherein said second storage means includes first overflow means at a first level in said second storage means to return said liquid back to said storage means and second overflow means at a second level in said second storage means to pass liquid to said waste disposal means.

6. The system of claim 5 wherein each of said vend stations is provided with a waste disposal unit said waste disposal unit further including a first switching means operable at a first liquid level to deenergize its associated vend station and a second switch means operable at a second level condition of liquid to deenergize the complete system.

7. The system of claim 1 including a drain means and control means, said control means being operative to prevent filling of the system with liquid when said drain means is in the open condition.

8. The system of claim 1 wherein said means for recirculating includes means to transport liquid from said first storage means to said vend stations, second storage means at said vend stations to maintain a predetermined supply of liquid prior to its being dispensed, regulating means in said means to maintain a predetermined supply to regulate the amount of liquid therein, means to return said liquid from said vend stations when the amount of liquid in said means to maintain a predetermined supply exceeds the predetermined supply, and pumping means including a pump and motor to constantly circulate said liquid between said storage means and said vend stations.

9. The system of claim 1 wherein said vending stations each further include a first pressure switch adapted to operate when fluid from said overflow means reaches a first level in said waste disposal means to deenergize its associated vend station and a second pressure switch adapted to operate when fluid from said overflow means reaches a second level in said waste disposal means to deenergize the storing and dispensing system.

10. The system of claim 1 further including refrigeration means to maintain said liquid in a refrigerated condition, temperature sensitive means for controlling the operation of said refrigeration means, and agitator means to circulate said liquid in said storage means, whereby actuation of said temperature sensing means in response to the temperature of said liquid being above a predetermined limit energizes said refrigeration means and said agitator means to cool and circulate said liquid in said storage means.

11. The system of claim 1 further including power supply means to provide a power source for said storing and dispensing system, fill station means adapted to receive liquid into said system from an external supply; said fill station means further including means to transmit power from said power supply means to said external supply to fill said storage means.

12. The system of claim 11 further including temperature sensitive means adapted to actuate upon contact with warm liquid, circuit means responsive to said temperature sensitive means to deenergize said vending means and to deenergize said fill station means to prevent filling of the system and vending of warm liquid.

13. The system of claim 1 further including power supply means to provide a power source for said system, refrigeration means energized by said power supply means to maintain said liquid in a refrigerated condition, and safety control means to prevent the dispensing of non-refrigerated liquid after a prolonged failure of said power supply means.

14. The system of claim 1 wherein said safety control means includes timer circuit means to deenergize said vending means after a predetermined time based on the perishability of the liquid in the storage means and the surrounding ambient temperature.

15. The system of claim 1 wherein said timer circuit means includes a thermistor, a solid state circuit and switching means whereby said circuit in conjunction with said thermistor produces a signal to actuate said switching means to deenergize said vend station subsystem.

16. The system of claim 1 further including fill station means adapted to receive liquid into said system from an external supply, circuit means operative in response to a detected high or low level condition to provide signals representative of either of said conditions, said circuit means comprising a means to deenergize the said fill station means upon detection of a high level condition of the liquid in said storage means and means to deenergize said vending means upon detection of a low level condition in said storage means.

17. The system of claim 4 wherein said circuit means include means preventing said signals until each of said electrodes in said electrode pairs is responsive to the high or low level condition thereby preventing spurious signals due to intermittent make and break contact with a single electrode of said electrode pairs.

18. In combination with a bulk liquid storing and dispensing system including storage means for storing fluid, vending means for dispensing predetermined amounts of said fluid and circulation means providing access between said storage means and said vending means, a subsystem to automatically clean and sanitize said system comprising automatic circuit control means to regulate a cleaning and sanitizing cycle, timing means to regulate the operation of said automatic circuit control means, means to release cleaning and sanitizing fluids into said storage and dispensing system and means to circulate said cleaning and sanitizing fluids within said system.

19. The combination of claim 18 which further includes switching means to deenergize said vending means and to energize said cleaning and sanitizing system.

20. The combination of claim 18 wherein said dispensing means includes a plurality of solenoid actuated valves, operable in response to a signal from said automatic circuit control means to dispense hot and cold water and cleaning solutions into said system.

21. The combination of claim 20 wherein said means to release said fluids further includes a pumping means to pump the hot and cold water into said system.

22. The combination of claim 18 wherein said means to circulate said fluids includes a motor and pump assembly adapted to operate in response to a signal from said automatic circuit control means to circulate said cleaning and sanitizing fluid throughout said system between said storage means and said vending means.

23. The combination of claim 18 wherein said automatic circuit control means includes a plurality of cam operated switches adapted to sequentially close a plurality of electrical circuits to energize said cleaning and sanitizing releasing means and said circulating means.

24. The combination of claim 23 wherein said timing means includes a timer motor to regulate the operation of said cam operated switches.

References Cited
UNITED STATES PATENTS

| | | | |
|---|---|---|---|
| 2,284,880 | 6/1942 | Nicholson | 222—36 X |
| 2,949,137 | 8/1960 | Arnett et al. | 222—54 X |
| 3,185,348 | 5/1965 | Pollak et al. | 222—318 X |
| 3,200,992 | 8/1965 | Maxwell | 222—318 X |
| 3,270,918 | 9/1966 | Goodrich et al. | 222—64 |
| 3,385,413 | 5/1968 | Jacobs et al. | 222—318 X |

STANLEY H. TOLLBERG, Primary Examiner

U.S. Cl. X.R.

222—54, 148